(12) United States Patent
Fukuda

(10) Patent No.: US 6,956,813 B2
(45) Date of Patent: Oct. 18, 2005

(54) RADIO COMMUNICATION SYSTEM, RADIO BASE-STATION APPARATUS, MOBILE RADIO-STATION APPARATUS, RADIO ZONE ASSIGNMENT METHOD, AND RADIO COMMUNICATION METHOD

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 812 days.

(21) Appl. No.: 09/879,332

(22) Filed: Jun. 12, 2001

(65) Prior Publication Data

US 2002/0015382 A1 Feb. 7, 2002

(30) Foreign Application Priority Data

Jun. 14, 2000 (JP) ............................ P2000-179002

(51) Int. Cl.[7] .............................................. H04J 11/00
(52) U.S. Cl. ...................................... 370/208; 370/343
(58) Field of Search ................................ 370/203, 208, 370/252, 281, 293, 295, 319, 329, 328, 332–334, 370/341, 343, 344, 431, 480, 481, 492; 375/343, 375/346, 145

(56) References Cited

U.S. PATENT DOCUMENTS

| | | | |
|---|---|---|---|
| 5,726,978 A | | 3/1998 | Frodigh et al. |
| 5,802,044 A | * | 9/1998 | Baum et al. ................. 370/330 |
| 5,828,660 A | * | 10/1998 | Baum et al. ................. 370/330 |
| 6,510,133 B1 | * | 1/2003 | Uesugi ........................ 370/208 |
| 6,628,673 B1 | * | 9/2003 | McFarland et al. .......... 370/481 |

FOREIGN PATENT DOCUMENTS

| | | |
|---|---|---|
| EP | 0697797 | 2/1996 |
| EP | 0975184 | 1/2000 |
| EP | 0986196 | 3/2000 |

OTHER PUBLICATIONS

Radio Resource Management Technique For Multilayered Cell System with Different Bandwidths, Kojima F. et al, Electronic Letters, vol. 33, No. 15, Jul. 17, 1997.

* cited by examiner

*Primary Examiner*—Ajit Patel
*Assistant Examiner*—Chirag Shah
(74) *Attorney, Agent, or Firm*—Jay H. Maioli

(57) ABSTRACT

A plurality of frequency-channels are provided, each composed of an OFDM multi-carrier. The OFDM sub-carrier of each channel is orthogonal to the sub-carrier of any other channel, so that two or more channels may be considered to transmit the same OFDM signal. Further, a sub-area that uses two or more channels is provided in each service area in which a base station is located at the center and assigned with a basic-frequency channel.

14 Claims, 15 Drawing Sheets

RADIO COMMUNICATION SYSTEM, RADIO BASE-STATION APPARATUS, MOBILE RADIO-STATION APPARATUS, RADIO ZONE ASSIGNMENT METHOD, AND RADIO COMMUNICATION METHOD

BACKGROUND OF THE INVENTION

1. Field of the Invention

The present invention relates to a radio communication system, a radio base-station apparatus, a mobile radio-station apparatus, a radio-zone assignment method and a radio communication method, all fit for use in mobile data communication, particularly radio transmission of multi-carrier signals.

2. Related Art

Two methods of setting many channels to provide mobile communication service in a larger geographical area are known. They are time division and frequency division. In the time-division method, use-time zones are assigned to cells, respectively, and the base stations must therefore be synchronized. A radio communication system that employs the time-division method is inevitably complex in configuration. In the frequency-division method, specific frequencies are assigned to the cells, respectively, and each base station can use the frequency assigned to it and can be controlled independently of any other base station. Thus, a radio communication system that adopts the frequency-division method is simple in configuration.

FIG. 1 illustrates a conventional base station 120, which is designed to transmit and receive data through the Internet network 12. As FIG. 1 shows, the base station 120 comprises a line controller 121, a central processing unit (CPU) 122, a channel coding/decoding section 123, a modulating/demodulating section 124, a transmitting/receiving section 125, and an antenna 126. The line controller 121 is connected to the Internet network 12, for controlling the line. The controller 121 receives data (IP packets) through the network 12. Each IP packet is supplied to the channel coding/decoding section 123. The section 123 converts the IP packet to data of radio-transmission format. The modulating/demodulating section 124 performs, for example, QPSK modulation on the data. The data thus modulated is supplied to the transmitting/receiving section 125. The section 125 performs transmission processes, such as frequency conversion and amplification, on the data. The data thus processed is transmitted by radio from the antenna 126 to communication terminals.

Any signal transmitted from a communication terminal and detected by the antenna 126 is supplied to the transmitting receiving section 125. The section 125 carries out a reception process, such as frequency conversion, on the signal, converting the signal to data, which is supplied to the modulating/demodulating section 124. The section 124 demodulates the data, which is supplied to the channel coding/decoding section 123. The section 123 decodes the data, thereby generating an IP packet. The IP packet is supplied to the line controller 121 and thence sent to the Internet network 12.

The central processing unit (CPU) 122 controls all processes effected in the base station 120, by using the bus line BL provided in the base station 120. When the base station 120 is installed in a geographical area (cell), it is assigned with a channel specific to the cell. The information representing the channel is stored in the memory incorporated in the line controller 121. The CPU 122 supplies the information to the transmitting/receiving section 125, which stores the information.

FIG. 2 shows a communication terminal 130. As shown in FIG. 2, the terminal 130 comprises an antenna 131, a transmitting/receiving section 132, a modulating/demodulating section 133, a channel coding/decoding section 134, a central processing unit (CPU) 135, a display section 136, and a control section 137. The antenna 131 receives the data transmitted from the base station 120 illustrated in FIG. 1. The transmitting/receiving section 132, which is connected to the antenna 131, effects a reception process, such as frequency conversion, on the data. The data is supplied to the modulating/demodulating section 133. The section 133 demodulates the data, which is supplied to the channel coding/decoding section 134. The section 134 converts the format of data, from radio-transmission format to IP packet format. The data of IP packet format is supplied to the central processing unit (CPU) 135. The CPU 135 processes the data by using an application program, generating data that can be displayed. The data is supplied to the display section 136.

The control section 137 connected to the central processing unit (CPU) 135 generates data (IP packet) to be transmitted to the base station 120. The data is supplied to the channel coding/decoding section 134. The section 134 converts the data to data of radio-transmission format. The radio-transmission format data is supplied to the modulating/demodulating section 133. The section 133 carries out modulation, such as QPSK modulation, on the data. The data, thus modulated, is supplied to the transmitting/receiving section 132. The section 132 performs transmission processes, such as frequency conversion and amplification, on the data. The data thus processed is transmitted by radio from the antenna 131 to the base station 120.

The information representing the channel assigned to the base station 120 is extracted from the control signal transmitted from the base station 120. The CPU 135 supplies the information to the transmitting/receiving section 132. The information is stored in the transmitting/receiving section 132.

Base stations including the base station 120 and communication terminals including the terminal 130 are connected to the Internet network 12, whereby a communication system is constituted. The communication terminal 130 can receive, for example, Internet broadcast programs from various content servers provided on the Internet network 12.

Radio signals to be transmitted between the base station 120 and the communication terminal 130 will be described. This communication system employs a single-carrier radio transmission scheme. In other words, data to be transmitted is modulated with a single carrier that falls within a prescribed channel band, into a radio transmission signal.

FIG. 3 illustrates an example of channel assignment, applied in the communication system. Both the up-link and the down-link are composed of a single carrier each. Eight channels are available. The carrier of each channel is modulated by QPSK modulation or the like. In the communication system, each base station uses one specific channel to achieve data communication with any communication terminal.

In the conventional communications system, the channels may be set by means of frequency division. If so, a frequency is divided into several bands, which are assigned to the cells of the communication system. The system is therefore simple, but the frequency band each cell can use is narrow. This makes it impossible to increase the transmission speed.

BRIEF SUMMARY OF THE INVENTION

The present invention has been made in view of the foregoing. An object of the invention is to provide a radio communication system in which frequency division sets the channels, rendering the inter-station synchronization unnecessary, which can cover a larger geographical service area, and which can yet increase communication speed.

According to a first aspect of the present invention, there is provided a radio communication system in which radio communication is performed between a base station and a mobile station. The station comprises: first transmitting means for transmitting a radio signal to the mobile station; first receiving means for receiving a radio signal from the mobile station; and first control means for controlling the first transmitting means and the first receiving means to achieve high-speed communication between the base station and the mobile station by using at least two basic-frequency channels, when the mobile station exists in a specific area within a cell to which a basic-frequency channel is assigned, the basic-frequency channel comprising a multi-carrier OFDM signal. The mobile station comprises: second transmitting means for transmitting a radio signal to the base station; second receiving means for receiving a radio signal from the base station; and second control means for controlling the second transmitting means and the second receiving means to achieve high-speed communication between the base station and the mobile station by using at least two basic-frequency channels, when the mobile station exists in the specific area.

According to a second aspect of the invention, there is provided a base station for use in a radio communication system in which radio communication is performed between the base station and a mobile station. The base station comprises: transmitting means for transmitting a radio signal to the mobile station; receiving means for receiving a radio signal from the mobile station; and control means for controlling the transmitting means and the receiving means to achieve high-speed communication between the base station and the mobile station by using at least two basic-frequency channels, when the mobile station exists in a specific area within a cell to which a basic-frequency channel is assigned, the basic-frequency channel comprising a multi-carrier OFDM signal.

According to a third aspect of this invention, there is provided a mobile station for use in a radio communication system in which radio communication is performed between a base station and the mobile station. The mobile station comprises: transmitting means for transmitting a radio signal to the base station; receiving means for receiving a radio signal from the base station; and control means for controlling the transmitting means and the receiving means to achieve high-speed communication between the base station and the mobile station by using at least two basic-frequency channels, when the mobile station exists in a specific area within a cell to which a basic-frequency channel is assigned, the basic-frequency channel comprising a multi-carrier OFDM signal.

According to a fourth aspect of the invention, there is provided a radio communication system in which radio communication is performed between a base station and a mobile station. The system comprises: a plurality of first-type cells to which one of a plurality of basic-frequency channel is assigned respectively, each channel comprising a multi-carrier OFDM signal; and a plurality of second-type cells, each provided in one first-type cell, to which the basic-frequency channels are assigned to achieve high-speed communication between the base station and the mobile station.

According to a fifth aspect of the present invention, there is provided a method of performing radio communication between a base station and a mobile station. The method comprises the steps of: performing radio communication between the base station and the mobile station through a basic-frequency channel assigned to each cell, the basic-frequency channel comprising a multi-carrier OFDM signal; and performing high-speed communication between the base station and the mobile station, through the basic-frequency channels when the mobile station exists in a specific area within the cell.

As described above, this invention can provide a radio communication system having a plurality of frequency channels, each assigned to one multi-carrier signal of OFDM scheme. In the system, the channels are simultaneously used in the center part of a cell, thereby transmitting data between the base station and any terminal at high speed. Therefore, the radio communication system can therefore help the user of the terminal to achieve Internet accesses at the highest speed possible.

With the present invention it is possible to expand the geographical area, without synchronizing the adjacent base stations.

In the radio communication system of the invention, neither the base station nor the communication terminal needs to have two or more transmitting/receiving sections or two or more modulation/demodulation sections. The system can therefore be provided at a low hardware cost.

DETAILED DESCRIPTION OF THE INVENTION

Embodiments of the present invention will be described, with reference to the accompanying drawings.

Figure 4:
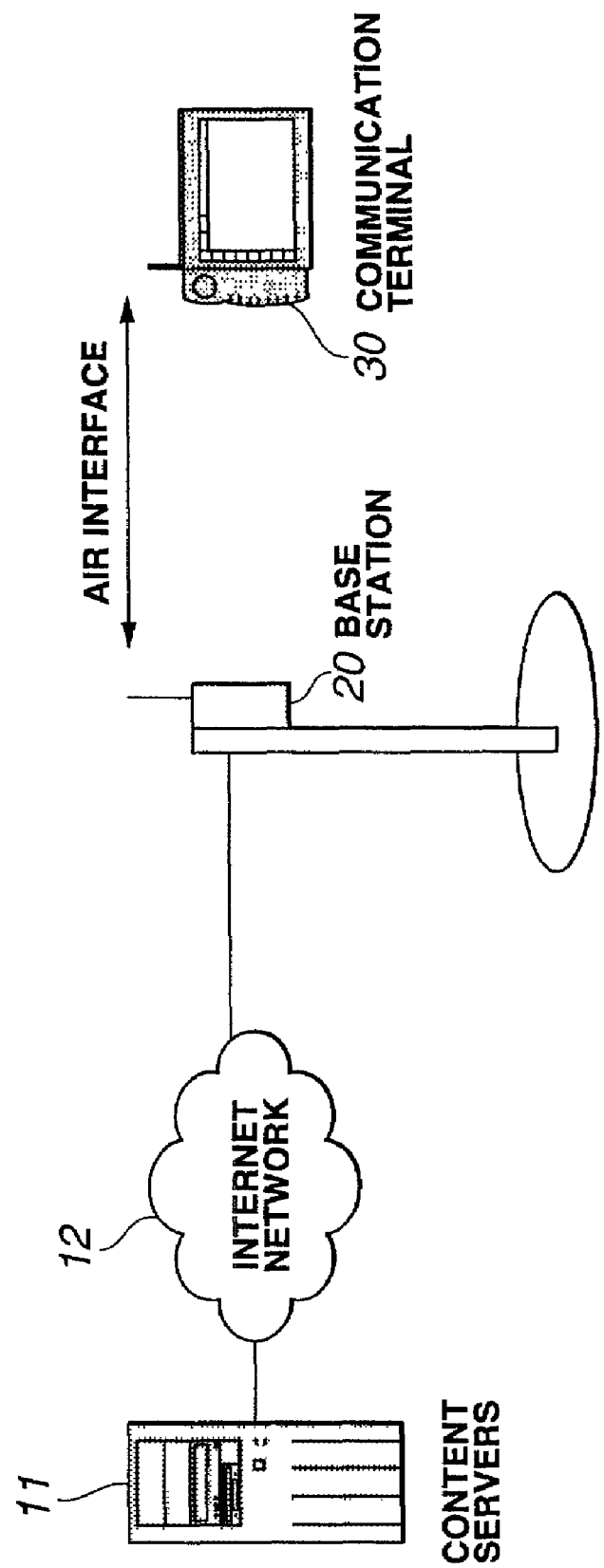
FIG. 4 shows a radio access system to which the present invention is applied.

The present invention may be applied to such a data communication system as is shown in FIG. 4.

As shown in FIG. 4, the data communication system comprises a content server 11, a base station 20 and a communication terminal 30. The content server 11 and the base station 20 are connected by the Internet network 12. The data communication system is designed to provide service called "IP (Internet Protocol) connection," which connects the base station 20 to the content server 11.

The base station 20 performs transmission scheme such as QPSK modulation, thereby to accomplish radio communication with the communication terminal 30. Thus, the base station 20 relays data from the terminal 30 to the Internet network 12.

The communication system of the invention employs the multi-carrier radio transmission scheme, which will be described below.

With the communication system it is possible to transmit various data items on the Internet via the base station 20 to the communication terminal 30 and to download them into the communication terminal 30. Conversely, data can be transmitted from the communication terminal 30 to the base station 20 and uploaded into the base station 20.

Signals are transmitted by radio between the base station 20 and the communication terminal 30. They are multi-carrier signals that are of OFDM (Orthogonal Frequency Division Multiplex) scheme.

The data processing that is performed in the base station 20 of the data communication system will be explained.

Figure 5:
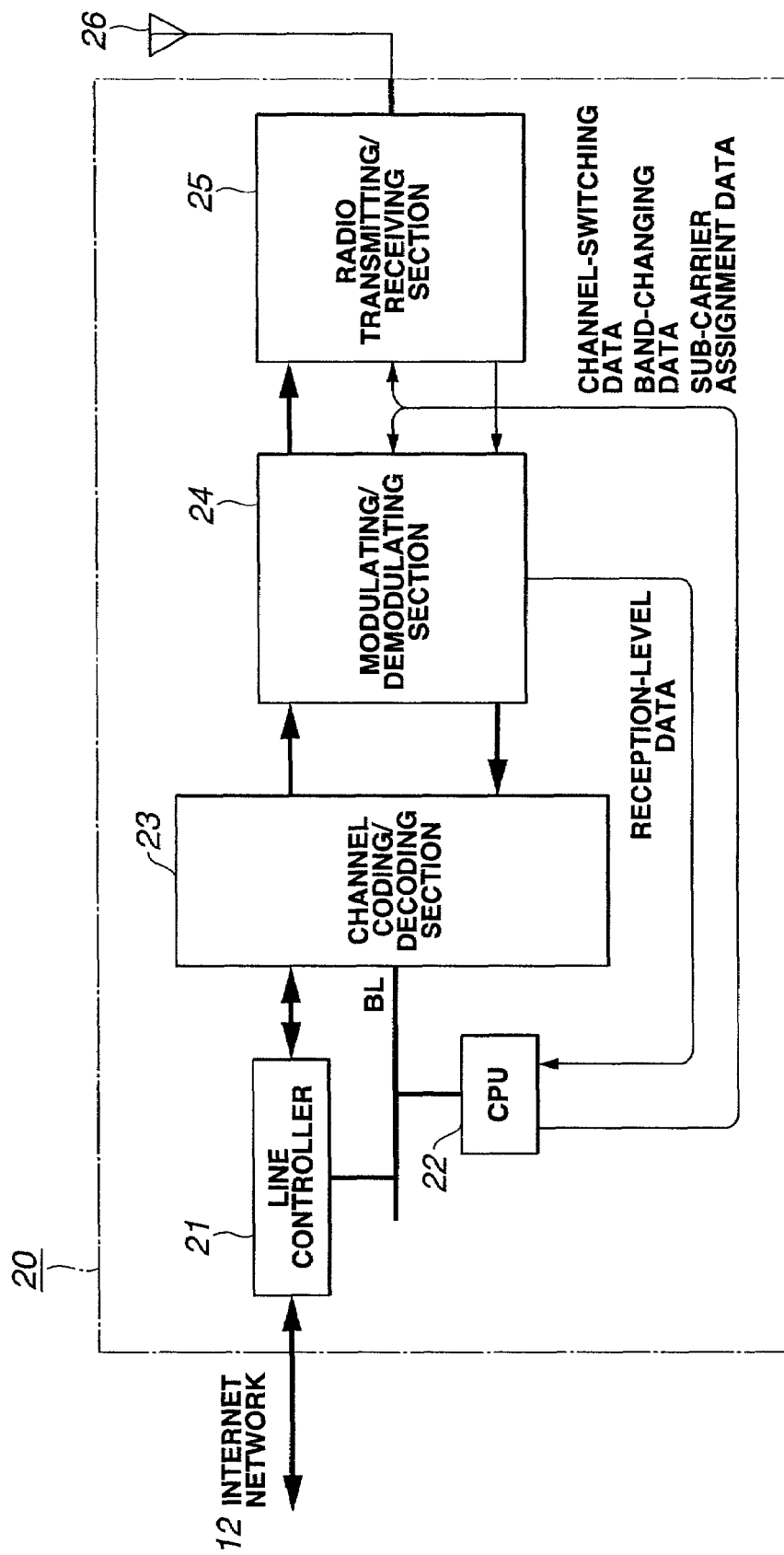
FIG. 5 is a block diagram of a base station according to the invention.

As shown in FIG. 5, the base station 20 comprises a line controller 21, a central processing unit (CPU) 22, a channel coding/decoding section 23, a modulating/demodulating section 24, a radio transmitting/receiving section 25, and an antenna 26. The line controller 21 is connected to the Internet network 12. The controller 21 receives data (IP packets) from the Internet network 12. Each IP packet is supplied from the controller 21 to the channel coding/decoding section 23. The section 23 converts the IP packet to data of radio-transmission format. The modulating/demodulating section 24 performs, for example, QPSK modulation on the data. The data modulated is supplied to the transmitting/receiving section 25. The section 25 performs transmission processes, such as frequency conversion and amplification, on the data. The data thus processed is transmitted by radio from the antenna 26 to the communication terminal 30.

Any signal transmitted from a communication terminal and detected by the antenna 26 is supplied to the transmitting/receiving section 25. The section 25 carries out a reception process, such as frequency conversion, on the signal, converting the signal to data, which is supplied to the modulating/demodulating section 24. The section 24 demodulates the data, which is supplied to the channel coding/decoding section 23. The section 23 decodes the data, thereby generating an IP packet. The IP packet is supplied to the line controller 21 and thence sent to the Internet network 12.

The central processing unit (CPU) 22 controls all processes effected in the base station 20, by using the bus line BL provided in the base station 20. When the base station 20 is installed in a geographical area (cell), it is assigned with a channel specific to the cell. The information representing the channel is stored in the memory incorporated in the line controller 21. The CPU 22 supplies the information to the transmitting/receiving section 25, which stores the information.

Figure 1:
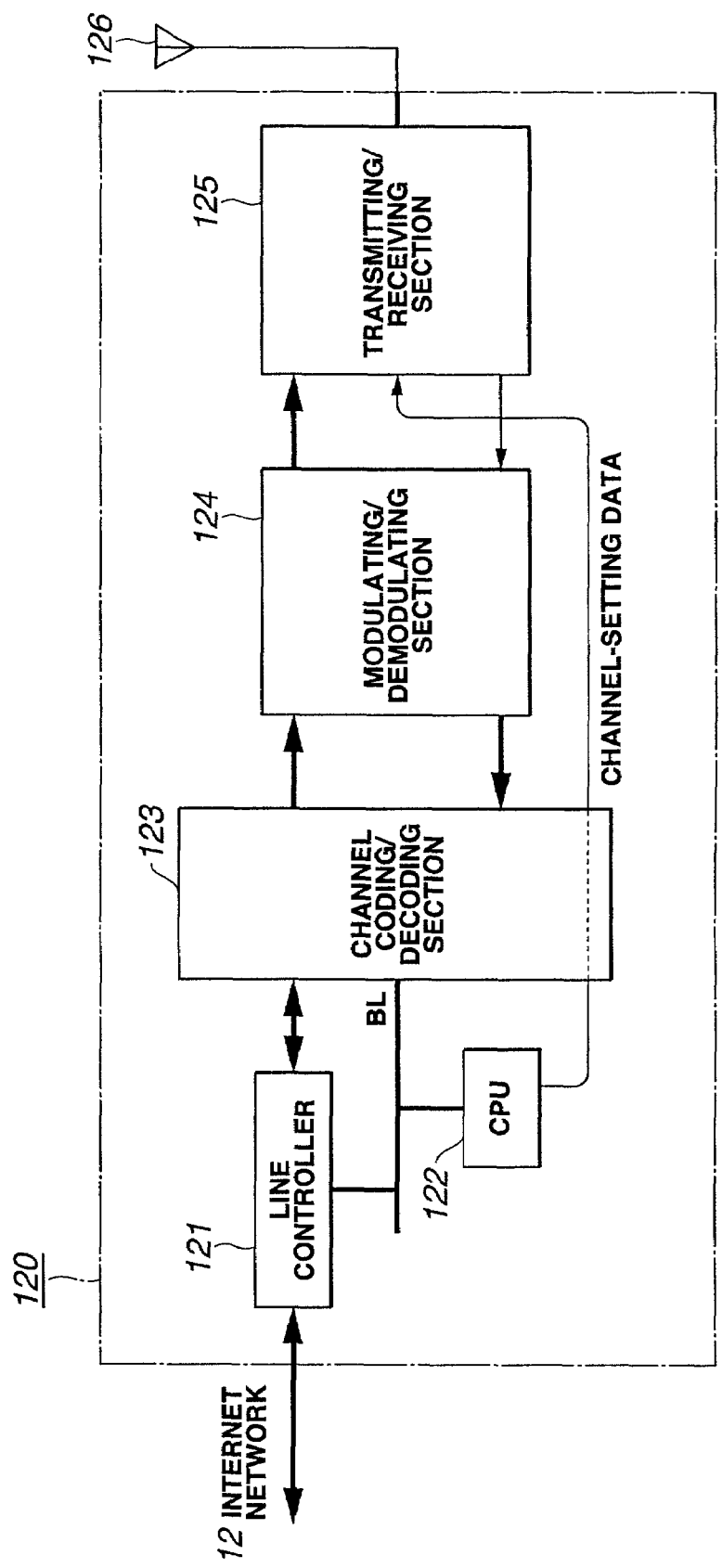
FIG. 1 is a block diagram showing a conventional base station.

The base station 20 is similar in structure to the conventional base station 120 shown in FIG. 1. However, the base station 20 processes radio signals by OFDM scheme, not by single-carrier radio transmission scheme as in the conventional base station 120. Additionally, the CPU 22 can change the filtering bands of the base-band filters provided in the transmission and reception systems. Unlike in the conventional base station 120, the CPU 22 can read reception-level data from the modulating/demodulating section 24.

Figure 6:
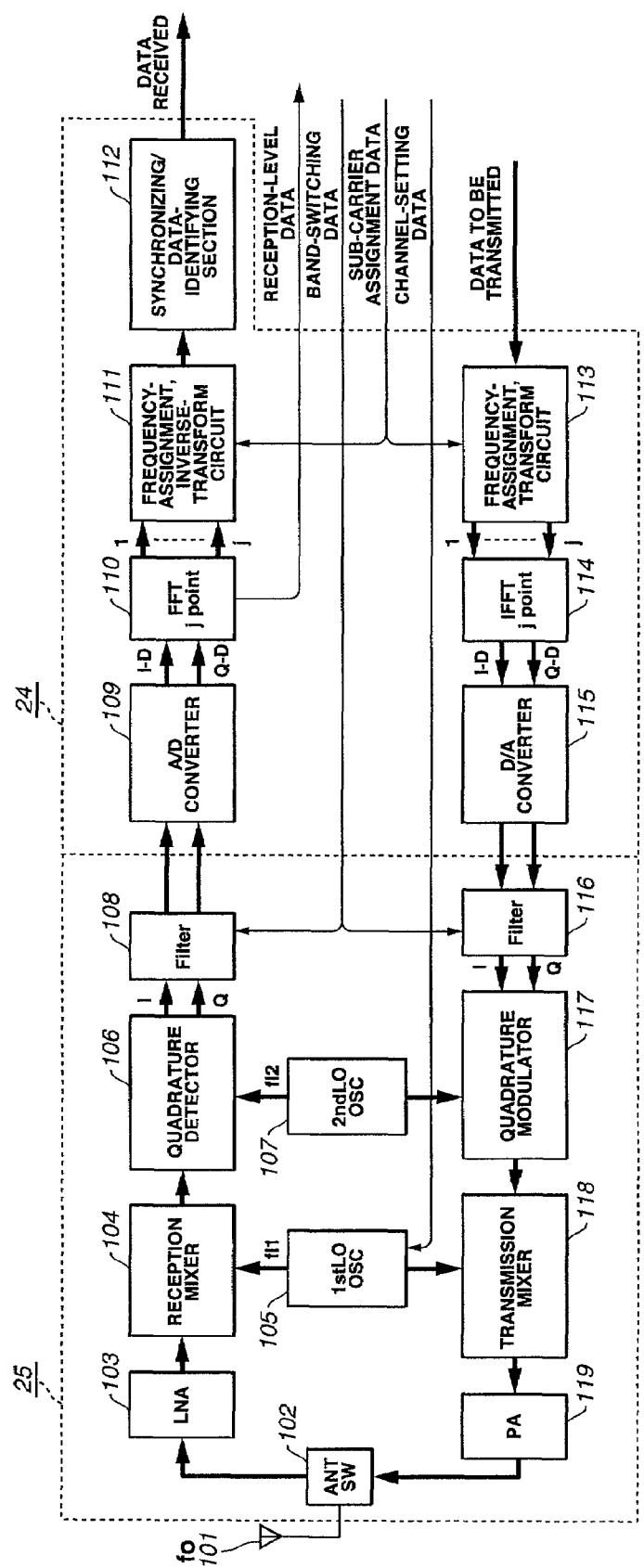
FIG. 6 is a block diagram of a communication terminal according to the present invention.

FIG. 6 is a block diagram showing the modulation/demodulation section 24 and the radio transmitting/receiving section 25, both incorporated in the base station 20. As is shown in FIG. 6, the radio transmitting/receiving section 25 comprises a receiving/transmitting antenna 101, an antenna switch 102, a low-noise amplifier 103, a reception mixer 104, a first local oscillator 105, a quadrature detector 106, a second local oscillator 107, a reception base-band filter 108, a transmission base-band filter 116, a quadrature modulator 117, a transmission mixer 118, and a power amplifier 119.

The receiving/transmitting antenna 101 is connected by the antenna switch 102 to the low-noise amplifier 103. The antenna 101 receives a signal, which is applied to the low-noise amplifier 103 via the antenna switch 102. The amplifier 103 amplifies the signal, which is supplied to the reception mixer 104. The first local oscillator 105 generates an output f11 based on the channel-setting data output from the CPU 22 and supplies the same to the reception mixer 194. The reception mixer 104 mixes the signal with an output f11 of the first local oscillator 105, generating an intermediate-frequency signal.

The intermediate-frequency signal the reception mixer 104 has generated is supplied to the quadrature detector 106. The second local oscillator 107 generates an output f12, which is supplied to the quadrature detector 106. The quadrature detector 106 mixes the intermediate-frequency signal with the output f12 of the second local oscillator 107, generating a mixed signal. The detector 106 performs quadrature detection, splitting the mixed signal into an I component and a Q component. The I component and the Q component are supplied to the reception base-band filter 108. Meanwhile, the filtering band of the filter 108 is changed in accordance with the band-switching data supplied from the CPU 22. The reception base-band filter 108 removes unnecessary frequency components from the I component and Q component. The I component and Q component are supplied to the modulating/demodulating section 24.

As shown in FIG. 6, the modulating/demodulating section 24 comprises an analog-digital converter 109, a fast Fourier transform (FFT) circuit 110, a frequency-assignment, inverse-transform circuit 111, a synchronization/decision section 112, a frequency-assigning converter circuit 113, an inverse Fourier transform (IFFT) circuit 114, and an digital/analog converter 115.

In the modulating/demodulating section 24, the analog-digital converter 109 converts the I component and Q component to digital data items I-D and Q-D. The digital data items I-D and Q-D are supplied to the fast Fourier transform circuit 110. The circuit 110 performs j-point, discrete Fourier transform on the digital data items I-D and Q-D, generating j-symbol parallel data. The fast Fourier transform circuit 110 supplies reception-level data to the CPU 22.

The j-symbol parallel data output from the fast Fourier transform circuit 110 is supplied to the frequency-assignment, inverse-transform circuit 111. The circuit 111 switches the assignment of sub-carrier in accordance with the sub-carrier assignment data supplied from the CPU 22. The circuit 111 converts the j-symbol parallel data to serial data. The serial data is supplied from the circuit 111 to the synchronization/decision section 112. The section 112 carries out frequency synchronization and symbol synchronization, thus determining the data the base station 20 has received.

In the transmission system of the base station 20, the data (serial data) to be transmitted is supplied to the frequency-assigning converter circuit 113. The circuit 113 switches the assignment of sub-carrier in accordance with the sub-carrier assignment data supplied from the CPU 22. The circuit 113 then converts the serial data to j number of parallel data items. These parallel data items are supplied to the inverse Fourier transform (IFFT) circuit 114. The circuit 114 carries out j-point, inverse discrete Fourier transform on the parallel data items, thereby generating digital base-band data items I-D and Q-D for two time axes that are orthogonal. The digital base-band data items I-D and Q-D are supplied to the digital/analog converter 115. The converter 115 converts the data items I-D and Q-D to two analog signals corresponding to the I component and the Q component, respectively. The I-component signal and the Q-component signal are supplied to the transmission base-band filter 116.

The transmission base-band filter 116 has its filtering band changed in accordance with the band-switching data supplied from the CPU 22. The filter 116 removes the unnecessary frequency components from the I-component signal and Q-component signal. The I-component signal and Q-component signal are supplied from the filter 116 to the quadrature modulator 117. The modulator 117 performs quadrature modulation on the I-component signal and Q-component signal in accordance with the output f12 of the second local oscillator 107, thereby generating a signal. This signal is supplied to the transmission mixer 118. The mixer 118 mixes the signal with the output f11 of the first local oscillator 105, which has been generated in accordance with the channel-setting data supplied from the CPU 22. Thus, the mixer 118 generates a signal of transmission frequency band f0. This signal is supplied to the power amplifier 119 and is amplified. The signal amplified is supplied via the switch 102 to the antenna 101. The antenna 101 transmits the signal by radio to communication terminals including the terminal 30.

The signal to be transmitted through a downward line, from the base station 20 to the communication terminal 30, is thus processed into a multi-carrier signal that is assigned to a specific channel.

The data processing that is performed in the communication terminal 30 of the data communication system will be explained.

Figure 7:
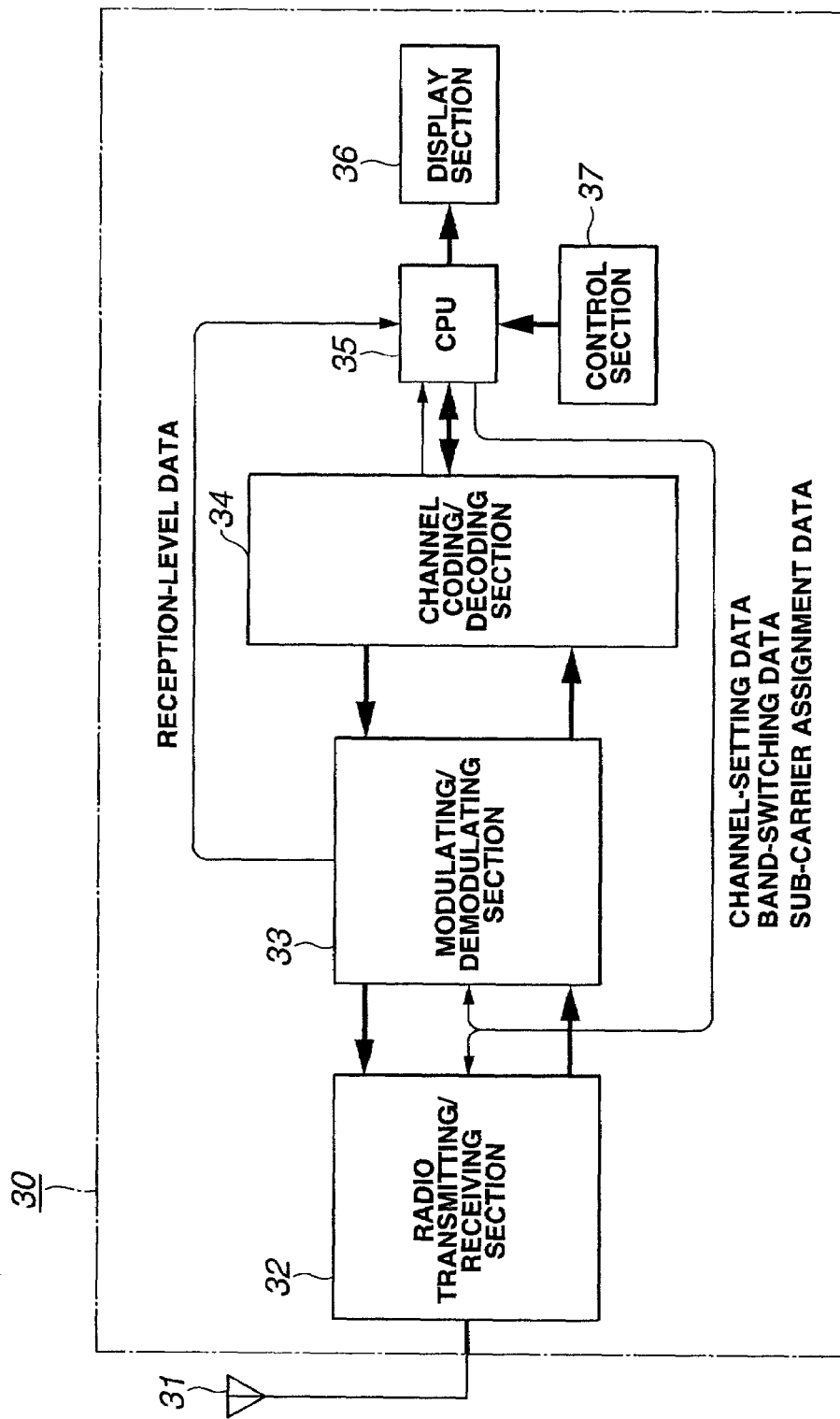
FIG. 7 is a block diagram showing the modulation/demodulation section and the radio transmitting/receiving section, both incorporated in the base station of FIG. 5.

FIG. 7 shows the communication terminal 30. As shown in FIG. 7, the terminal 30 comprises an antenna 31, a radio transmitting/receiving section 32, a modulating/demodulating section 33, a channel coding/decoding section 34, a central processing unit (CPU) 35, a display section 36, and a control section 37. The antenna 31 receives the data transmitted from the base station 20 illustrated in FIG. 5. The transmitting/receiving section 32, which is connected to the antenna 31, effects a reception process, such as frequency conversion, on the data. The data is supplied to the modulating/demodulating section 33. The section 33 demodulates the data, which is supplied to the channel coding/decoding section 34. The section 34 converts the format of data, from radio-transmission format to IP packet format. The data of IP packet format is supplied to the central processing unit (CPU) 35. The CPU 35 processes the data by using an application program, generating data that can be displayed. The data is supplied to the display section 36.

The control section 37 connected to the central processing unit (CPU) 35 generates data (IP packet) to be transmitted to the base station 20. The data is supplied to the channel coding/decoding section 34. The section 34 converts the data to data of radio-transmission format. The radio-transmission format data is supplied to the modulating/demodulating section 33. The section 33 carries out modulation, such as QPSK modulation, on the data. The data, thus modulated, is supplied to the radio transmitting/receiving section 32. The section 32 performs transmission processes, such as frequency conversion and amplification, on the data. The data thus processed is transmitted by radio from the antenna 31 to the base station 20.

The information representing the channel assigned to the base station 20 is extracted from the control signal transmitted from the base station 20. The CPU 35 supplies the information to the radio transmitting/receiving section 32. The information is stored in the radio transmitting/receiving section 32.

Figure 2:
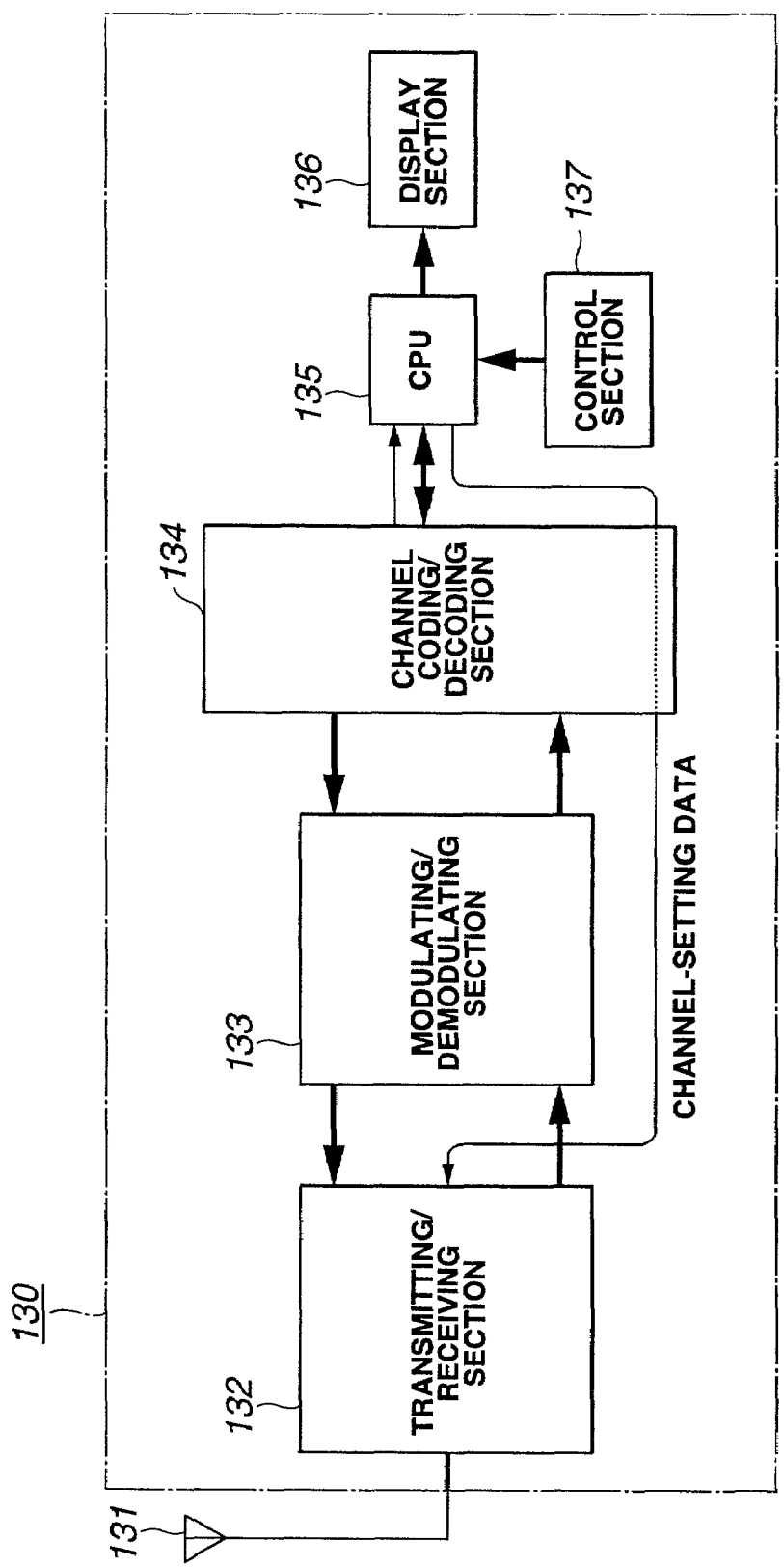
FIG. 2 is a block diagram of a conventional communication terminal.
Figure 3:
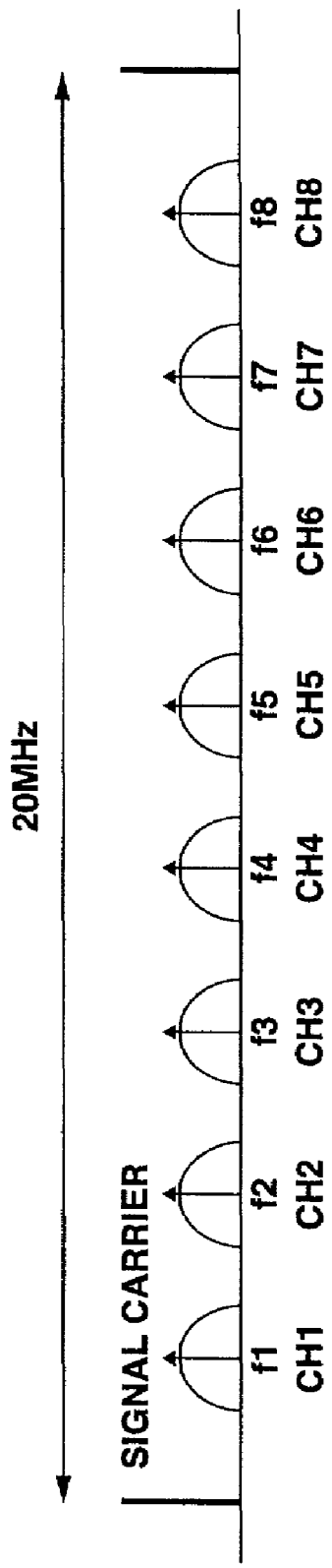
FIG. 3 is a diagram illustrating an example of channel assignment applied to a conventional communication system.

The communication terminal 30 is similar in structure to the conventional communication terminal 130 shown in FIG. 2. However, the terminal 30 processes radio signals by OFDM scheme as the base station 20, not by single-carrier radio transmission scheme as in the conventional communication terminal 130. Additionally, the CPU 35 can change the filtering bands of the base-band filters provided in the transmission and reception system. Unlike in the conventional terminal 30, the CPU 35 can read reception-level data from the modulating/demodulating section 33.

The radio transmitting/receiving section 32 and the modulating/demodulating section 33 are basically the same as the radio transmitting/receiving section 25 and modulating/demodulating section 24 of the base station 20. Therefore, neither the section 32 nor the section 33 will be described in detail.

How to assign channels in the OFDM scheme will be described below.

Figure 8:
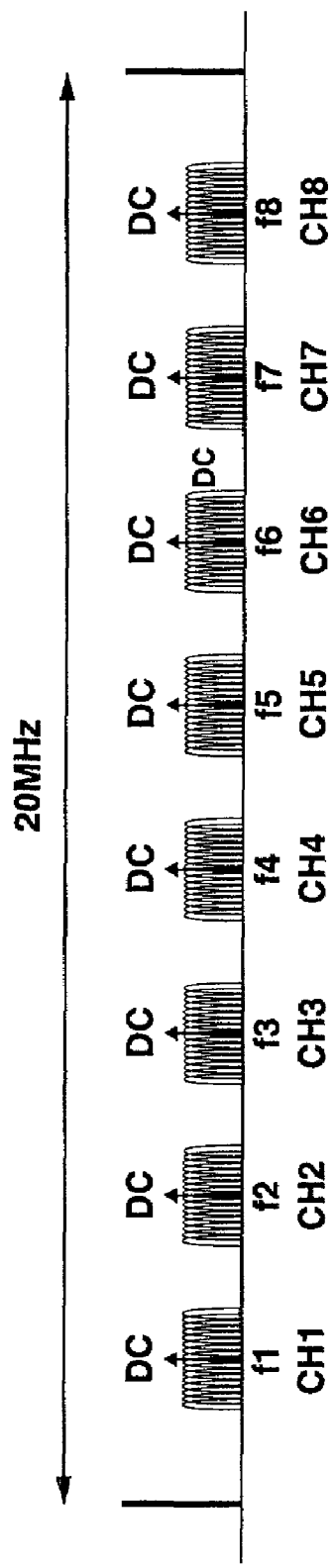
FIG. 8 is a diagram illustrating the channel assignment according to the present invention.

FIG. 8 is a diagram illustrating the case where a communication band that has a width of 20 MHz is divided into eight OFDM sub-bands of frequency. Eight channels are assigned to these sub-bands, respectively. The OFDM sub-carrier of each channel is subjected to modulation such as QPSK modulation, so that it may be orthogonal to the sub-carrier of any other channel. Further, the channels for each cell have eight sub-bands that are orthogonal to the corresponding sub-carriers for any other cell. In one cell, the base station and any communication terminal exchange data in, for example, ISMA (Idle Signal Multiple Access) method, by using one of the eight channels CH1 to CH8 available in the cell.

In FIG. 8, each arrow DC indicates the direct-current component that corresponds to the center frequency f0 of the base band. The sub-carrier may be modulated by QPSK method, the parameters set in the OFDM scheme may be a symbol length of 6.4 μsec and a guard interval of 1.6 μsec, and 10 sub-carriers may be available. In this case, the maximum transmission rate for one channel is about 2.5 Mbps. The channels CH2 to CH7 are allocated to the other cells, respectively. Thus, each of the seven cells can transmit data at the maximum rate of about 2.5 Mbps.

The cell arrangement and the channel assignment, both proposed in the present invention, will be explained.

Figure 9:
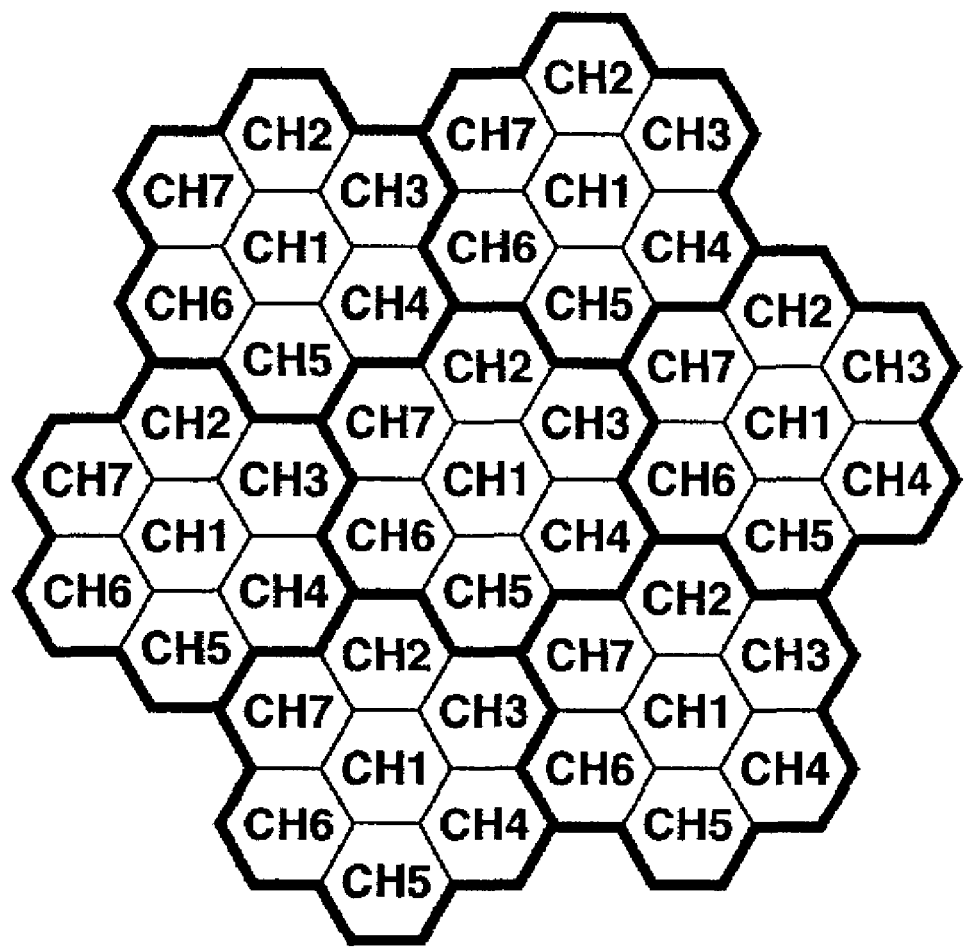
FIG. 9 represents the channel-cell relationship applied in the present invention.

FIG. 9 represents the relationship between the channels on the one hand, and the cells on the other hand. Seven channels are repeatedly assigned to seven cell groups, each consisting of seven cells. That is, seven of the eight channels provided by dividing the 20-MHz communication band into eight OFDM sub-bands. This helps to expand the geographical area in which the mobile communication service can be offered. The remaining one channel can be used as the control channel common to the seven cells of each cell group.

Figure 10:
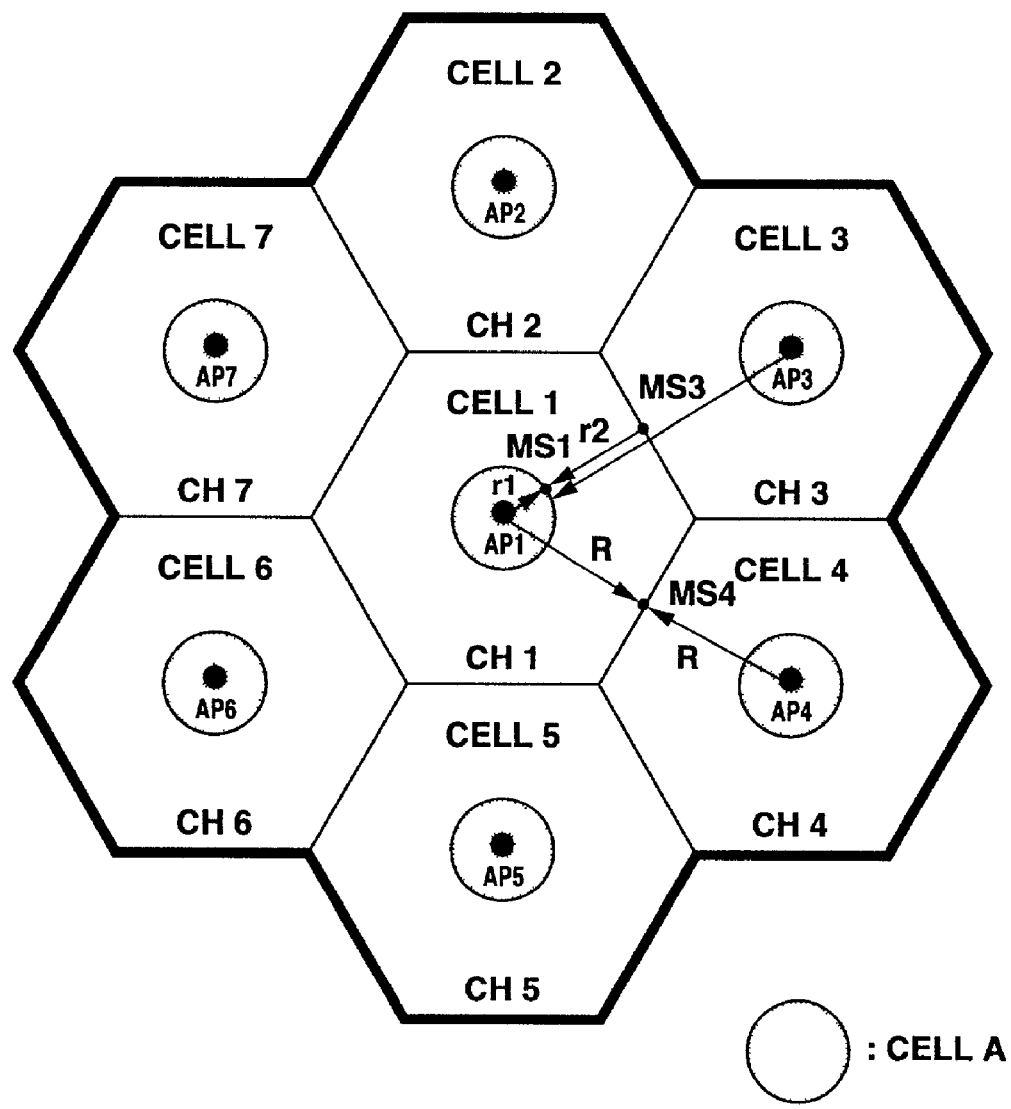
FIG. 10 shows the relation between the cells of the communication system according to the invention.
Figure 11:
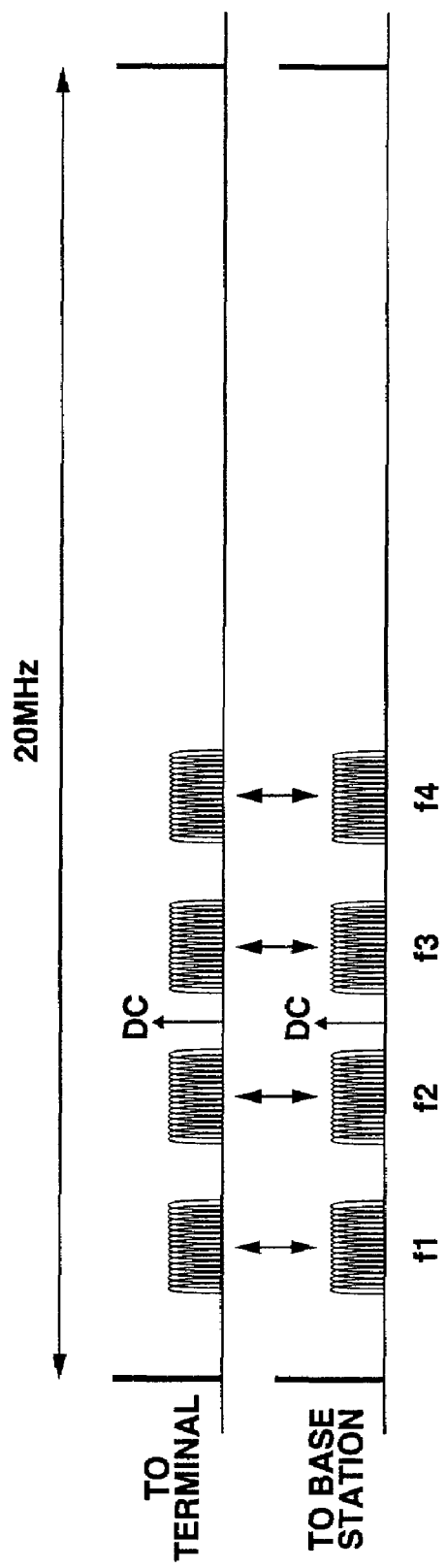
FIG. 11 is a diagram explaining how data communication is performed in the cell A of the communication system according to the invention.

FIG. 10 shows one of the seven cell groups illustrated in FIG. 9. Seven sub-cells A are provided in the seven cells 1 to 7 of the cell group, respectively. The sub-cells A are located around the base stations AP1 to AP7 installed in the each cells 1 to 7, so that data communication may be effected at high speed in each cell, between the base station and any communication terminal existing in the sub-cell A. The sub-cell A in each cell uses, for example, four OFDM channels (e.g., f1, f2, f3 and f4) of above-described channels CH1 to CH7, as a single OFDM channel to accomplish high-speed data communication. FIG. 11 illustrates how data communication is performed in the sub-cell A provided within one cell. As can be understood from FIG. 11, data can be transmitted in the sub-cell A though one channel, four times as fast as in the ordinary cell. Hence, data can be transmitted in the sub-cell A at maximum rate of 10 Mbps, whereas data is transmitted in the ordinary cell at maximum rate of 2.5 Mbps.

A sub-cell A can be provided only if the following four conditions (1) to (3) are satisfied:

(1) In FIG. 10, in the communication terminal MS1 located in the sub-cell A in the cell. 1 and communicating with the base station AP1, any desired carrier (f1, f2, f3 or f4) has a CIR (Carrier-to-Interference Ratio) equal to or greater than a predetermined value, with respect to the interference wave f3 from the terminal MS3 provided in the cell 3.

(2) In FIG. 10, in the communication terminal MS1 located in the sub-cell A in the cell 1 and communicating with the base station AP1, any desired carrier (f1, f2, f3 or f4) has a CIR (Carrier-to-Interference Ratio) equal to or greater than a predetermined value, with respect to the interference waves f1, f2, f3 and f4 from the base station AP3 provided in the cell 3.

(3) In FIG. 10, in the communication terminal MS4 located at the border between the cells 1 and 4 and communicating with the base station AP4, the desired carrier f4 from the base station AP4 has a CIR (Carrier-to-Interference Ratio) equal to or greater than a predetermined value, with respect to the interference waves f1, f2, f3 and f4 from the base station AP1 provided in the cell 1.

To fulfill these conditions, it is necessary to select a proper transmitting power and an appropriate radius r1 for the sub-cell A, an appropriate distance r1 between the circumference of the sub-cell A and the border between two adjacent cells, and a proper radius R for each cell. The conditions can be fulfilled if, for example, r1=50 m, r2=200 m, and R=250 m.

Figure 12:
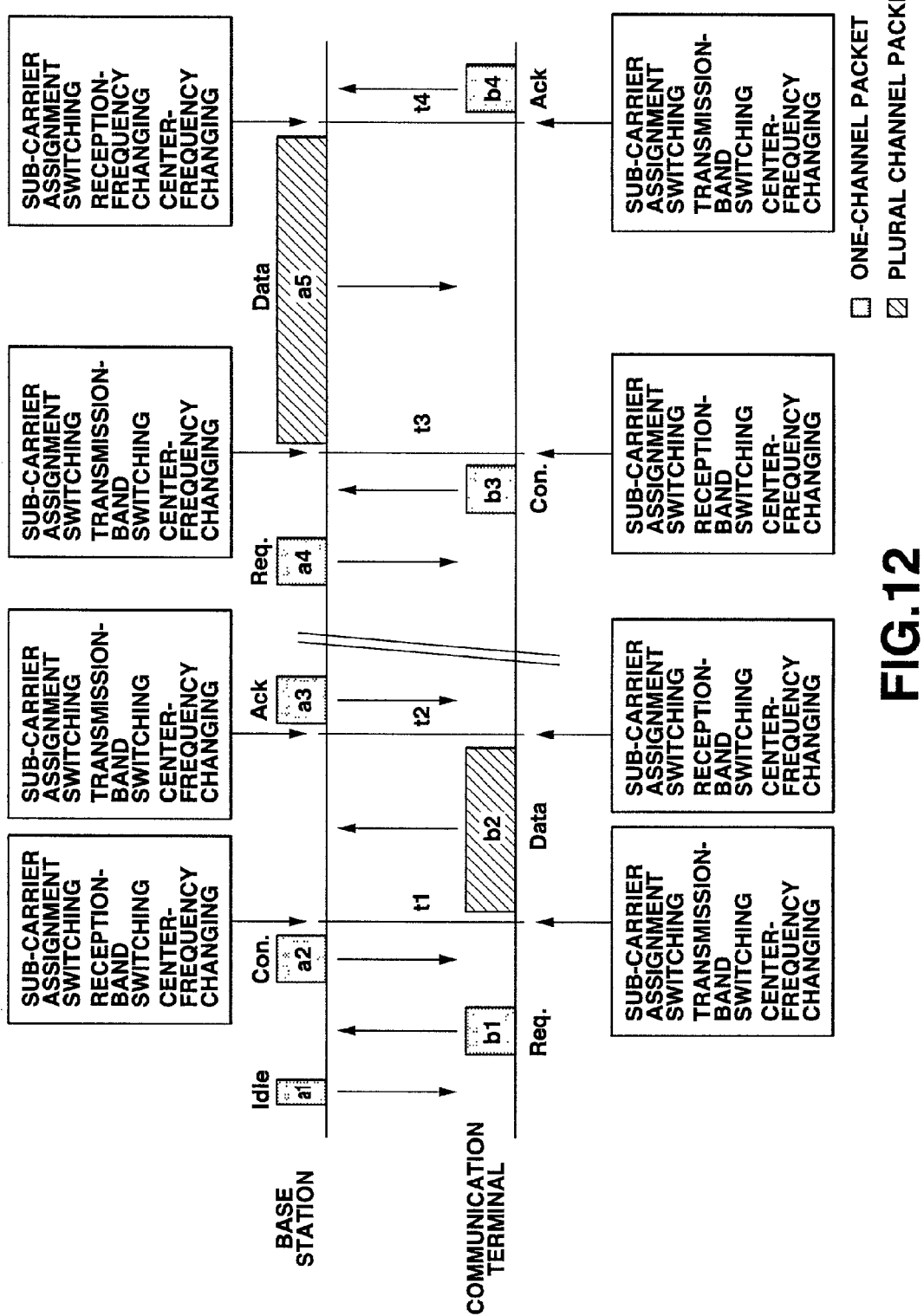
FIG. 12 shows a control sequence of communication effected in the communication system of this invention.

How the control sequence is performed in the communication system of the invention will be described, with reference to FIG. 12. Shown in the upper part of FIG. 12 are packets transmitted from the base station 20 (FIG. 5) to the communication terminal 30 (FIG. 7). Shown in the lower part of FIG. 12 are packets transmitted from the communication terminal 30 to the base station 20.

Data is transmitted from the communication terminal 30 to the base station 20 in the following sequence of steps A1 to A5:

Step A1: The base station transmits an idle packets Idle (a1) at random.

Step A2: If the communication terminal has data to transmit to the base station, it transmits a transmission request packet (b1) through one channel, immediately after it has received the idle packet (a1). The idle packet (a1) the terminal has received from the base station has a level higher than a prescribed level. In the communication terminal, the CPU 35 determines that the terminal exists within the sub-cell A, from the reception-level data supplied from the modulating/demodulating section 33. In this case, the transmission request packet (b1) contains data requesting for simultaneous data transmission through four channels. However, the transmission request packet (b1) may not reach the base station if it collides with any other packet. This may happen because the terminal transmits the transmission request packet (b1) in contention with the other communication terminals. If the transmission request packet (b1) fails to reach the base station, the communication terminal carries out a random retry.

Step A3: The base station receives the transmission request packet (b1) from the communication terminal, at a level that is higher than the prescribed level. Hence, the base station transmits a confirmation packet (a2) to the communication terminal. The confirmation packet (a2) contains the data for allowing the simultaneous data transmission through four channels. In the base station, the CPU 22 supplies the band-switching data to the radio transmitting/receiving section 25, changing the filtering band from a one-channel band to a four-channel band. The CPU 22 gives an instruction to the radio transmitting/receiving section 25, causing the section 25 to set the center frequency of the base band at the value indicated DC shown in FIG. 11. At time t1, the CPU 22 supplies the sub-carrier assignment data to the modulating/demodulating section 24, thereby switching the OFDM scheme, from one using 10 sub-carriers to one using 40 sub-carriers.

Step A4: Having received the confirmation packet (a2), the communication terminal starts the procedure of transmitting data through four channels. That is, the CPU 35 supplies the band-switching data to the radio transmitting/receiving section 32. The filtering band is thereby switched, from the one-channel band to the four-channel band. The CPU 35 gives an instruction to the radio transmitting/receiving section 32, causing the section 32 to set the center frequency of the base band at the value indicated DC shown in FIG. 11. At time t1, the CPU 35 supplies the sub-carrier assignment data to the modulating/demodulating section 33, thereby switching the OFDM scheme, from one using 10 sub-carriers to one using 40 sub-carriers.

Data can now be transmitted through four channels. The communication terminal transmits data packets (b2) to the base station through four channels. Then, the radio transmitting/receiving section 32 and the modulating/demodulating section 33 are set back into the one-channel reception state at time t2, so that the communication terminal may receive an acknowledge packet from the base station.

Step A5: Having received the data packets (b2), the base station starts the procedure of transmitting data through one channel. That is, the CPU 22 supplies the band-switching data to the radio transmitting/receiving section 25. The filtering band is thereby switched, from the four-channel band to the one-channel band. The CPU 22 gives an instruction to the radio transmitting/receiving section 25, causing the section 25 to set the center frequency of the base band at the value indicated DC shown in FIG. 8. At time t2, the CPU 22 supplies the sub-carrier assignment data to the modulating/demodulating section 33, thereby switching the OFDM scheme, from one using 40 sub-carriers to one using 10 sub-carriers.

Data can now be transmitted through one channel. The base station transmits data packets (a3) to the communication terminal through one channel.

Data is transmitted from the base station to the communication terminal in the following sequence of steps B1 to B4:

Step B1: To transmit data, the base station transmits a transmission request packet (a4) to the communication terminal through one channel. The data packet (b2) the base station received last from the communication terminal has a level higher than the prescribed level. In the base station, the CPU 22 determines that the communication terminal exists within the sub-cell A containing a request data for simultaneous data transmission through four channels to the transmission request packet (a4), based on the reception-level data supplied from the modulating/demodulating section 24.

Step B2: The communication terminal receives the transmission request packet (a4) from the base station, at a level that is higher than the prescribed level. Hence, the terminal transmits a confirmation packet (b3) to the base station. The confirmation packet (b3) contains the data for allowing the simultaneous data transmission through four channels. In the communication terminal, the CPU 35 supplies the band-switching data to the radio transmitting/receiving section 32, changing the filtering band from the one-channel band to the four-channel band. The CPU 35 gives an instruction to the radio transmitting/receiving section 32, causing the section 32 to set the center frequency of the base band at the value indicated DC shown in FIG. 11. At time t3, the CPU 35 supplies the sub-carrier assignment data to the modulating/demodulating section 33, thereby switching the OFDM scheme, from one using 10 sub-carriers to one using 40 sub-carriers.

Step B3: Having received the data packets (b3), the base station starts the procedure of transmitting data through four channels. That is, the CPU 22 supplies the band-switching data to the radio transmitting/receiving section 25. The filtering band is thereby switched, from the one-channel band to the four-channel band. The CPU 22 gives an instruction to the radio transmitting/receiving section 25, causing the section 25 to set the center frequency of the base band at the value indicated DC shown in FIG. 11. At time t3, the CPU 22 supplies the sub-carrier assignment data to the modulating/demodulating section 24, thereby switching the OFDM scheme, from one using 10 sub-carriers to one using 40 sub-carriers.

Data can now be transmitted through four channels. The base station transmits data packets (a5) to the communication terminal through four channels. Then, the radio transmitting/receiving section 25 and the modulating/demodulating section 24 are set back into the one-channel reception state at time t4, so that the base terminal may receive an acknowledge packet from the communication terminal.

Step B4: Having received the data packets (a5), the communication terminal starts the procedure of transmitting data through one channel. That is, the CPU 35 supplies the band-switching data to the radio transmitting/receiving section 32. The filtering band is thereby switched, from the four-channel band to the one-channel band. The CPU 35 gives an instruction to the radio transmitting/receiving section 32, causing the section 32 to set the center frequency of the base band at the value indicated DC shown in FIG. 8. At time t4, the CPU 35 supplies the sub-carrier assignment data to the modulating/demodulating section 33, thus switching the OFDM scheme, from one using 40 sub-carriers to one using 10 sub-carriers.

Data can now be transmitted through one channel. The communication terminal transmits an acknowledge packet (b4) to the base station through one channel.

Figure 13:
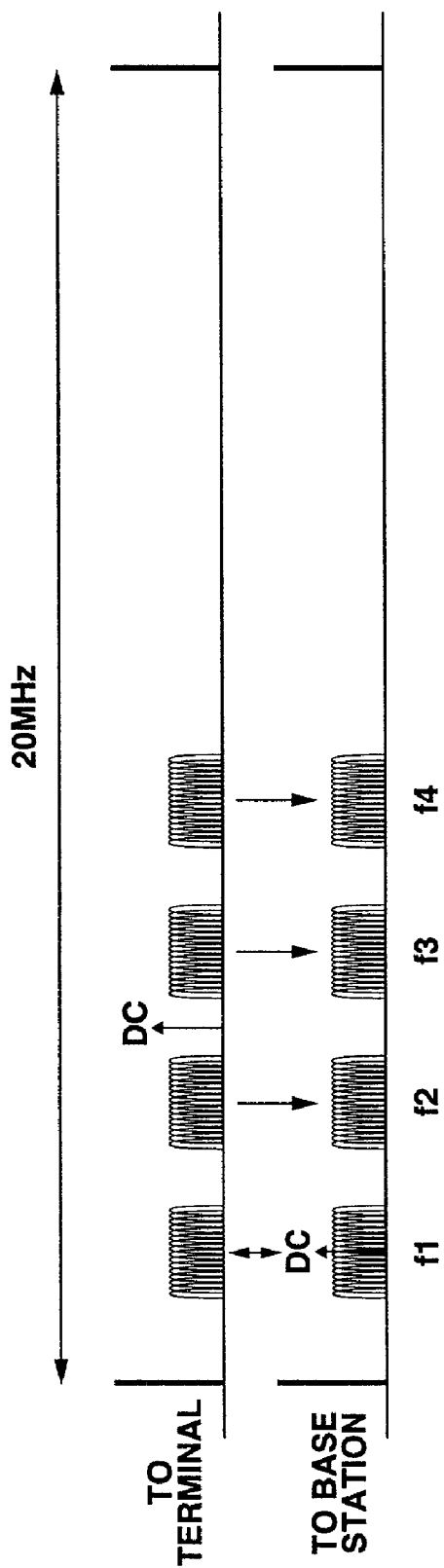
FIG. 13 illustrates asymmetrical communication carried out in the cell A of the system according to the invention.
Figure 14:
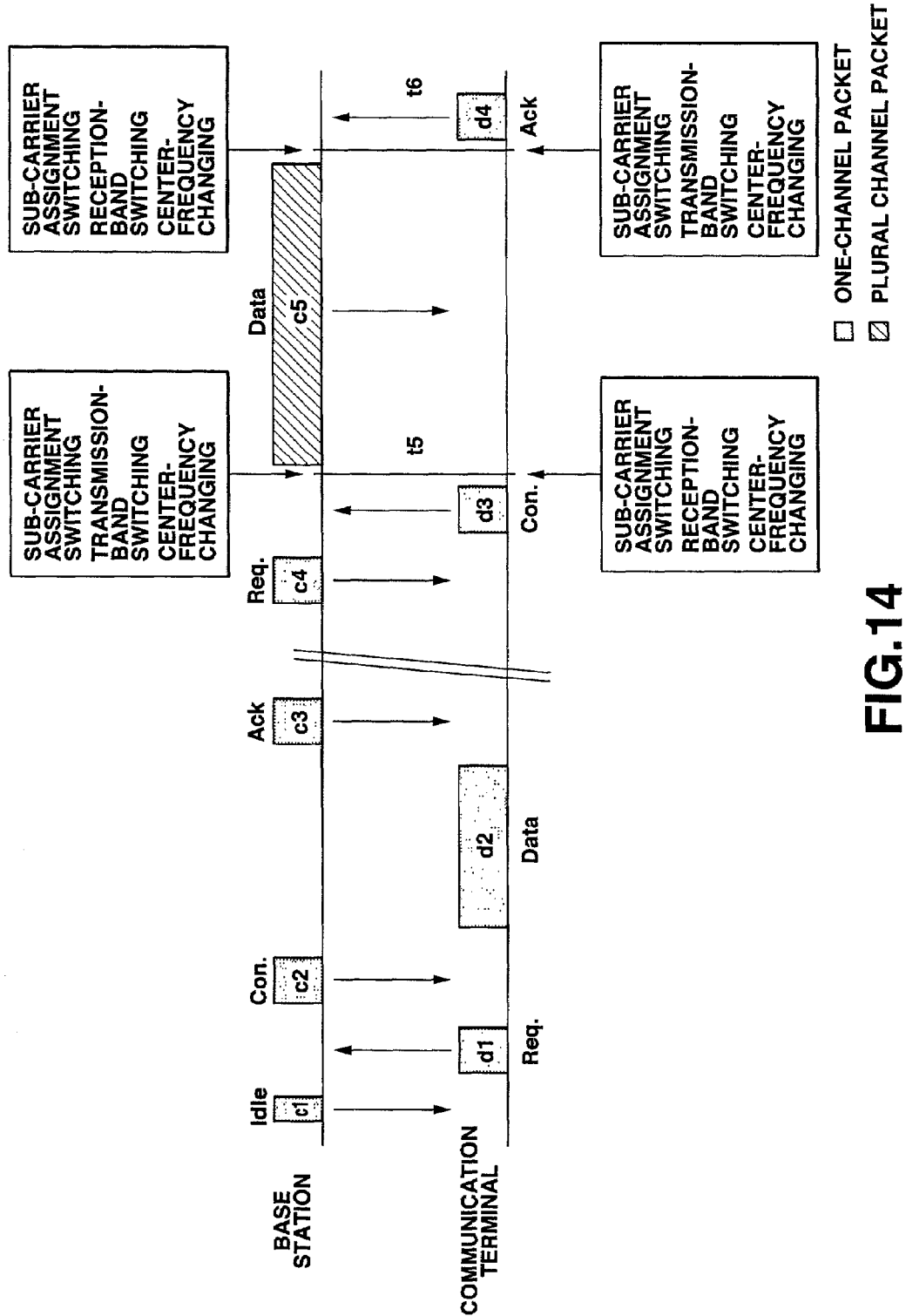
FIG. 14 depicts a control sequence of asymmetrical communication effected in the communication system of the invention.

Note that the control sequence explained with reference to FIG. 12 is one that is performed when data is transmitted from the communication terminal to the communication terminal at the same rate as from the terminal to the base station. In the network service, more data is transmitted from the base station to the terminal than from the terminal to the base station. Further, due to the limited transmission power of the communication terminal, data is transmitted to the base station through only one channel in most cases. That is, as shown in FIG. 13, only one channel is used to transmit data from the terminal to the base station, though four channels are used to transmit data from the base station to the terminal in the OFDM scheme. How data is transmitted from the base station to the terminal at a higher rate than from the terminal to the base station will be descried, with reference to FIG. 14.

Data is transmitted from the base station to the communication terminal in the following sequence of steps C1 to C5:

Step C1: The base station transmits an idle packets Idle (c1) at random.

Step C2: If the communication terminal has data to transmit to the base station, it transmits a transmission request packet (d1) through one channel, immediately after it has received the idle packet (c1). The idle packet (c1) the terminal has received from the base station has a level higher than a prescribed level. The terminal has no transmission power large enough to transmit data through four channels at the same time. This is why the terminal transmits the transmission request packet (d1) through one channel. The transmission request packet (d1) may not reach the base station if it collides with any other packet. This may happen because the terminal transmits the transmission request packet (d1) in contention with the other communication terminals. If the transmission request packet (d1) fails to reach the base station, the communication terminal carries out a random retry.

Step C3: The base station receives the transmission request packet (d1) from the communication terminal. The base station transmits a confirmation packet (c2) to the communication terminal, thus responding to the communication terminal.

Step C4: Having received the confirmation packet (c2) from the base station, the communication terminal transmits a data packet (d2) to the base station.

Step C5: Having received the data packet (d2) from the terminal, the base station transmits an acknowledge packet (c3) to the communication terminal.

Data is transmitted from the terminal to the base station in the following sequence of steps D1 to D4:

Step D1: To transmit data to the communication terminal, the base station transmits a transmission request packet (c4) to the communication terminal through one channel. The data packet (d2) the base station received last from the communication terminal has a level higher than the prescribed level. In the base station, the CPU 22 determines that the communication terminal exists within the sub-cell A containing a request data for simultaneous transmission through four channels to the transmission request packet (c4), based on the reception-level data that has been supplied from the modulating/demodulating section 24.

Step D2: The communication terminal receives the transmission request packet (c4) from the base station, at a level that is higher than the prescribed level. Hence, the terminal transmits a confirmation packet (d3) to the base station. The confirmation packet (d3) contains the data for allowing the simultaneous data transmission through four channels.

In the communication terminal, the CPU 35 supplies the band-switching data to the radio transmitting/receiving section 32, changing the filtering band from the one-channel band to the four-channel band. The CPU 35 gives an instruction to the radio transmitting/receiving section 32, causing the section 32 to set the center frequency of the base band at the value indicated DC shown in FIG. 11. At time t5, the CPU 35 supplies the sub-carrier assignment data to the modulating/demodulating section 33, switching the OFDM scheme, from one using 10 sub-carriers to one using 40 sub-carriers.

Step D3: Having received the data packets (d3), the base station starts the procedure of transmitting data through four channels. More precisely, the CPU 22 supplies the band-switching data to the radio transmitting/receiving section 25. The filtering band is thereby switched, from the one-channel band to the four-channel band. The CPU 22 then gives an instruction to the radio transmitting/receiving section 25, causing the section 25 to set the center frequency of the base band at the value indicated DC shown in FIG. 11. At time t5, the CPU 22 supplies the sub-carrier assignment data to the modulating/demodulating section 24, thereby switching the OFDM scheme, from one using 10 sub-carriers to one using 40 sub-carriers.

Data can now be transmitted through four channels. The base station transmits data packets (c5) to the communication terminal through four channels. Then, the radio transmitting/receiving section 25 and the modulating/demodulating section 24 are set back into the one-channel reception state at time t6, so that the base terminal may receive an acknowledge packet from the communication terminal.

Step D4: Having received the data packets (c5), the communication terminal starts the procedure of transmitting data through one channel. That is, the CPU 35 supplies the band-switching data to the radio transmitting/receiving section 32. The filtering band is thereby switched, from the four-channel band to the one-channel band. The CPU 35 gives an instruction to the radio transmitting/receiving section 32, causing the section 32 to set the center frequency of the base band at the value indicated DC shown in FIG. 8. At time t6, the CPU 35 supplies the sub-carrier assignment data to the modulating/demodulation section 33. The OFDM scheme is thereby switched from one using 40 sub-carriers to one using 10 sub-carriers.

Data can now be transmitted through one channel. The communication terminal transmits an acknowledge packet (d4) to the base station through one channel.

Thus, data communication can be accomplished at high speed in the sub-cell A provided within any ordinary cell.

Figure 15:
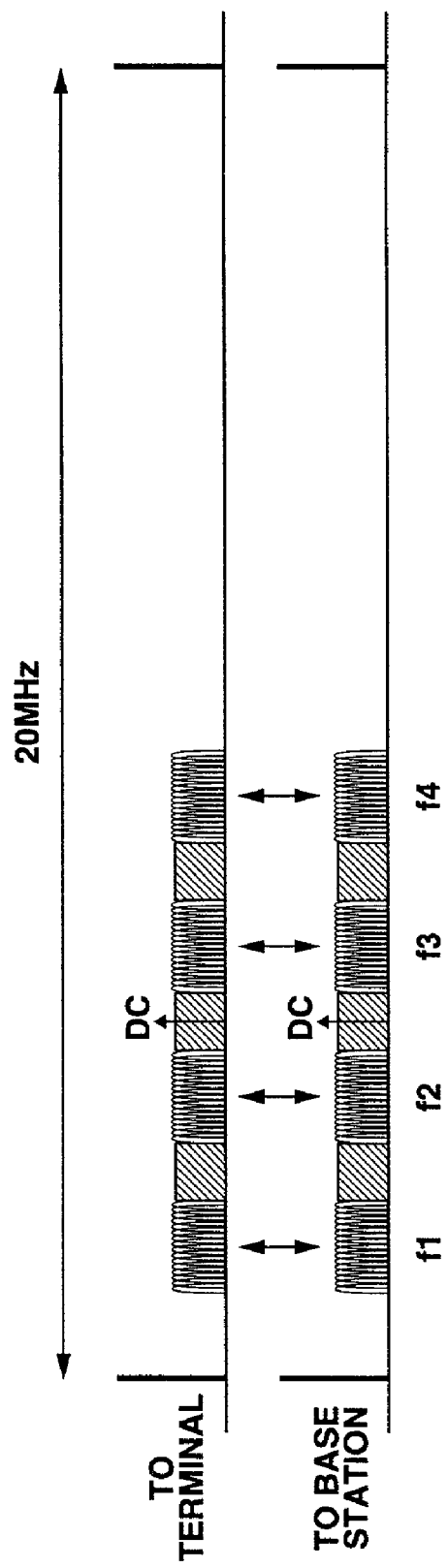
FIG. 15 is a diagram explaining another method of data communication performed in the cell A of the system according to the present invention.

In the embodiment described above, one multi-carrier signal that is assigned to each channel in the OFDM scheme. The OFDM sub-carrier of each channel is orthogonal to the sub-carrier of any other channel, so that two or more channels may be considered to transmit the same OFDM signal. Further, a sub-area using two or more channels is provided in the service area in which a base station is located at the center and assigned with a basic-frequency channel. The present invention is not limited to the embodiment, nonetheless. Sub-carriers may be added to each OFDM channel, among the basic frequency channels, thereby providing a new service area in which high-speed data communication can be achieved between the base station and any mobile station. To be more specific, as shown in FIG. 15, a sub-carrier (shaded area) may be added, between two adjacent OFDM channels. An OFDM signal superposed on a continuous carrier can thereby be transmitted, at most four times as fast as is possible than otherwise.

In the embodiment, either the base station or the communication terminal determines whether the base station exists in the sub-cell A, from the level at which the base station has received a signal. Instead, whether the base station exists in the sub-cell A may be determined from the error rate of decoding the data received, which reflects the quality of the data received. Alternatively, whether the base station exists in the sub-cell A may be determined from both the receipt level of the data and the decoding error rate.

What is claimed is:

1. A radio communication system in which radio communication is performed between a base station and a mobile station, the base station comprising:
   first transmitting means for transmitting a first transmitted radio signal to the mobile station;
   first receiving means for receiving a first received radio signal from the mobile station; and
   first control means for controlling the first transmitting means and the first receiving means to achieve high-speed communication between the base station and the mobile station, when the mobile station exists in a specific area within a cell to which a basic-frequency channel is assigned, by using at least two basic-frequency channels, each basic-frequency channel having a multi-carrier OFDM signal; and
   the mobile station comprising:
   second transmitting means for transmitting a second transmitted radio signal to the base station;
   second receiving means for receiving a second received radio signal from the base station; and
   second control means for controlling the second transmitting means and the second receiving means to achieve high-speed communication between the base station and the mobile station by using at least two basic-frequency channels, when the mobile station exists in the specific area,
   wherein the specific area is an area with a predetermined transmitting power, a predetermined radius between the circumference of the specific area and the border between two adjacent cells, and a predetermined radius for each cell.

2. The radio communication system according to claim 1, wherein the base station and/or the mobile station determine whether the mobile station exists in the specific area based on the first received radio signal or the second received radio signal.

3. The radio communication system according to claim 1, wherein the high-speed communication is achieved through one OFDM frequency channel composed of the basic-frequency channels and sub-carrier channels provided among the basic-frequency channels.

4. A base station for use in a radio communication system in which radio communication is performed between the base station and a mobile station, the base station comprising:
- transmitting means for transmitting a transmitted radio signal to the mobile station;
- receiving means for receiving a received radio signal from the mobile station; and
- control means for controlling the transmitting means and the receiving means to achieve high-speed communication between the base station and the mobile station, when the mobile station exists in a specific area within a cell to which a basic-frequency channel is assigned, by using at least two basic-frequency channels, each basic-frequency channel having a multi-carrier OFDM signal,
- wherein the specific area is an area with a predetermined transmitting power, a predetermined radius between the circumference of the specific area and the border between two adjacent cells, and a predetermined radius for each cell.

5. The base station according to claim 4, wherein the control means determines whether the mobile station exists in the specific area based on the received radio signal the receiving means has received from the mobile station.

6. The base station according to claim 4, wherein the high-speed communication is achieved through the OFDM frequency channel composed of the basic-frequency channels and sub-carrier channels provided among the basic-frequency channels.

7. A mobile station for use in a radio communication system in which radio communication is performed between a base station and the mobile station, the mobile station comprising:
- transmitting means for transmitting a transmitted radio signal to the base station;
- receiving means for receiving a received radio signal from the base station; and
- control means for controlling the transmitting means and the receiving means to achieve high-speed communication between the base station and the mobile station, when the mobile station exists in a specific area within a cell to which a basic-frequency channel is assigned, by using at least two basic-frequency channels, each basic-frequency channel having a multi-carrier OFDM signal,
- wherein the specific area is an area with a predetermined transmitting power, a predetermined radius between the circumference of the specific area and the border between two adjacent cells, and a predetermined radius for each cell.

8. The mobile station according to claim 7, wherein the control means determines whether the mobile station exists in the specific area based on the received signal the receiving means has received from the base station.

9. The mobile station according to claim 7, wherein the high-speed communication is achieved through one OFDM frequency channel composed of the basic-frequency channels and sub-carrier channels provided among the basic-frequency channels.

10. A radio communication system in which radio communication is performed between a base station and a mobile station, the radio communication system comprising:
- a plurality of first-type cells to which each of a plurality of basic-frequency channel is assigned respectively, each channel comprising a multi-carrier OFDM signal; and
- a plurality of second-type cells, each of which is provided in one first-type cell, of the plurality of first-type cells, to which the basic-frequency channels are assigned to achieve high-speed communication between the base station and the mobile station,
- wherein the specific area is an area with a predetermined transmitting power, a predetermined radius between the circumference of the specific area and the border between two adjacent cells, and a predetermined radius for each cell.

11. The radio communication system according to claim 10, wherein the high-speed communication is achieved through one OFDM frequency channel composed of the basic-frequency channels and sub-carrier channels provided among the basic-frequency channels.

12. A method of performing radio communication between a base station and a mobile station, the method comprising the steps of:
- performing radio communication between the base station and the mobile station through a basic-frequency channel assigned to each cell, the basic-frequency channel comprising a multi-carrier OFDM signal; and
- performing high-speed communication between the base station and the mobile station, through the basic-frequency channels when the mobile station exists in a specific area within the cell,
- wherein the specific area is an area with a predetermined transmitting power, a predetermined radius between the circumference of the specific area and the border between two adjacent cells, and a predetermined radius for each cell.

13. The method according to claim 12, further comprises the step of
- determining whether the mobile station exists in the specific area based on the signals received by either the base station and the mobile station.

14. The method according to claim 12, wherein the high-speed communication is achieved through one OFDM frequency channel composed of the basic-frequency channels and sub-carrier channels provided among the basic-frequency channels.

* * * * *